United States Patent [19]

Winterhalter

[11] Patent Number: 5,276,336
[45] Date of Patent: Jan. 4, 1994

[54] METHOD OF AND ARRANGEMENT FOR INDIVIDUALLY ACTIVATING VALVES

[75] Inventor: Peter Winterhalter, Schorndorf, Fed. Rep. of Germany

[73] Assignee: Herion-Werke KG, Fellbach, Fed. Rep. of Germany

[21] Appl. No.: 886,042

[22] Filed: May 19, 1992

[30] Foreign Application Priority Data

May 21, 1991 [DE] Fed. Rep. of Germany ...... 4116570

[51] Int. Cl.$^5$ .............................................. G02B 27/00
[52] U.S. Cl. ........................................ 250/551; 359/144
[58] Field of Search ............... 250/551, 227.21; 310/317, 311; 359/144, 147, 148; 318/554, 480

[56] References Cited

U.S. PATENT DOCUMENTS

| | | | |
|---|---|---|---|
| 4,718,112 | 1/1988 | Shinoda | 359/148 |
| 4,621,375 | 11/1986 | Simnovec | 359/148 |
| 4,665,316 | 5/1987 | Hodges | 250/551 |
| 4,761,749 | 8/1988 | Titsworth et al. | 359/148 |
| 4,820,916 | 4/1989 | Patriquin | 250/227.21 |
| 4,905,279 | 2/1990 | Nishio | 359/148 |
| 5,051,601 | 9/1991 | Atobe et al. | 250/551 |

*Primary Examiner*—David C. Nelms
*Assistant Examiner*—K. Shami
*Attorney, Agent, or Firm*—Feiereisen & Kueffner

[57] ABSTRACT

The invention relates to a method and an arrangement for selective driving of valves of small drive power by means of light. A control generates control signals which are modulated onto a light source which emits said control signals which are received by all the valves via solar cells. However only the addressed valve is switched. No cabling is necessary between the control and the valves.

4 Claims, 1 Drawing Sheet

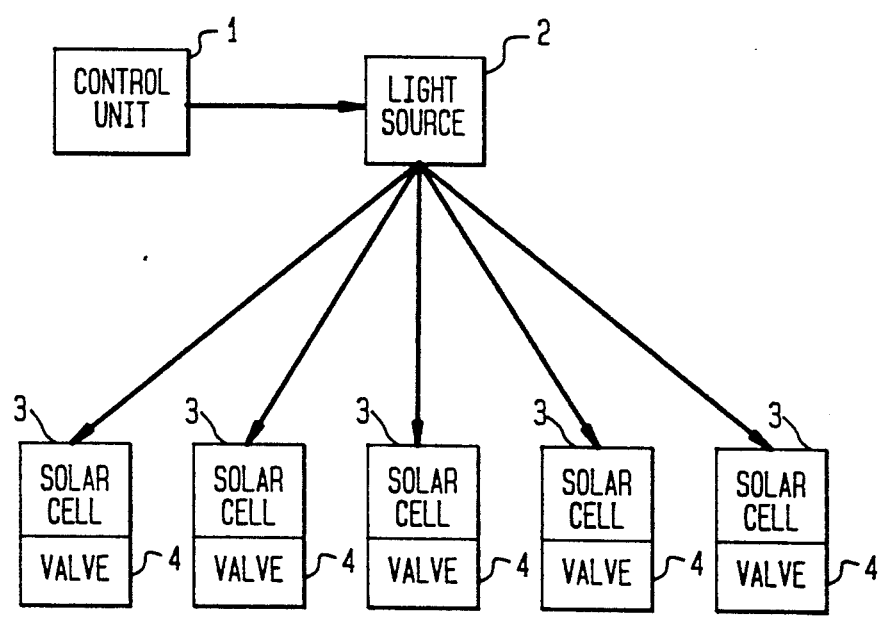

METHOD OF AND ARRANGEMENT FOR INDIVIDUALLY ACTIVATING VALVES

BACKGROUND OF THE INVENTION

The invention relates to a method and an arrangement for driving in particular a plurality of devices, such as valves, with low drive power, for example piezo valves.

For driving valves, i.e. transmitting information between a control device and a plurality of valves, various methods are known. However, generally in all these methods electrical or optical lines are employed via which the necessary information is supplied to the individual valves.

In many uses this creates problems, in particular when the valves are employed on moving units.

SUMMARY OF THE INVENTION

It is thus an object of the present invention to further develop a method and an arrangement of the type set forth at the beginning in such a manner that driving of the valves is possible without using electrical or optical lines.

According to the invention, this object is achieved in that in a control the desired control signal is generated and modulated onto a light source, that the light source emits the control signal and that the latter is received by all the valves.

The control signal here contains an address signal for driving a specific valve and a function signal for performance of a specific function by the activated valve.

The arrangement for carrying out the method consists of the electrical control, which is suitably coupled to the light source, and a plurality of valves, each of which is provided with a solar cell and an electronic circuit.

The respective receiving address of the valve concerned is stored in the electronic circuit of each valve.

BRIEF DESCRIPTION OF THE DRAWING

An example of an embodiment of the invention will be explained hereinafter with the aid of the drawing, in which the single figure shows schematically an arrangement according to the invention.

DETAILED DESCRIPTION OF PREFERRED EMBODIMENTS

A control 1 is connected to a light source 2 in suitable manner, for example by means of conventional electrical lines.

In the control 1 the control signals are generated which contain an address component for activating the valve which is to perform a function and a function component which gives the valve the command to perform a specific function, for example opening or closing.

The control signals coming from the control 1 are superimposed or modulated onto the light source 2 as is known per se, for example from optical telephone technology or infrared remote control technology.

The type of modulation may differ, for example may be amplitude modulation, frequency modulation or pulse width modulation. The transmission format for selective addressing of one of the valves may likewise be freely chosen. Suitable for example are methods of conventional bus structures, such as house bus, A bus or interbus.

In the drawing five valves 4 are illustrated, each of which is provided with a solar cell 3. Each valve 4 is further provided with an electronic circuit in which the receiving address of the respective valve is stored.

The inherent current requirement of the valves 4 can for example be provided by the daylight surrounding the valves and/or by the light source 2.

The light source 2 emits the control signals acquired from the control 1 and received by all the valves 4 via their solar cells 3.

However, only the valve 4 having the receiving address associated with the address component contained in the control signal is switched.

The invention thus makes it possible to selectively drive valves of small drive power (Lying for example in the region of about 0.05 watt) by means of light via solar cells and provide them with information.

No cabling is necessary between the control and the valves and the only requirement is a light connection in the visible range, which can however also take place behind glass or via mirrors.

While the invention has been illustrated and described as embodied in a method and arrangement for driving valves, it is not intended to be limited to the details shown since various modifications and structural changes may be made without departing in any way from the spirit of the present invention.

What is claimed as new and desired to be protected by Letters Patent is set forth in the appended claims;

I claim:

1. A method of selectively activating a plurality of valves, such as piezo valves or like devices of low drive power, comprising the steps of:
   generating a control signal which includes an address component for communicating with a particular valve and a function component for causing the valve to perform a specific function;
   modulating the control signal in a light source to form a modulated signal;
   emitting the modulated signal to all valves, with only the particular valve being responsive to the modulated signal; and
   providing each valve with a solar cell for converting light emitted from the light source into current for said valve to meet its own current demand.

2. An arrangement for selectively activating a plurality of valves, such as piezo valves or like devices of low drive power, comprising:
   a control unit for generating a control signal which includes an address component for communicating with a particular valve and a function component for causing the valve to perform a specific function; and
   a light source operatively connected to said control unit for modulating the control signal to form a modulated signal;
   each of said valves being provided with a solar cell for receiving said modulated signal and for converting incident light emitted from said light source or from radiant daylight into current for said valve to meet its own current demand, and an electronic circuit which is responsive to said modulated signal in dependence of said address component.

3. The arrangement defined in claim 2 wherein said electronic circuit of each device includes a receiving address complementary to the address component of said control signal.

4. A method of selectively activating a plurality of valves, such as piezo valves or like devices of low drive power, comprising the steps of:

generating a control signal which includes an address component for communicating with a particular valve and a function component for causing the valve to perform a specific function;

modulating the control signal in a light source to form a modulated signal;

emitting the modulated signal to all valves, with only the particular valve being responsive to the modulated signal; and providing each valve with a solar cell for converting radiant daylight into current for the valve to meet its own current demand.

* * * * *